United States Patent [19]

Linstromberg et al.

[11] Patent Number: 4,732,010
[45] Date of Patent: Mar. 22, 1988

[54] POWER SWITCH AND BAFFLE ASSEMBLY HAVING UNIDIRECTIONAL DRIVE MOTOR FOR A REFRIGERATOR

[75] Inventors: William J. Linstromberg, Lincoln Township, Berrien County; Donald E. Janke, Benton Township, Berrien County, both of Mich.

[73] Assignee: Whirlpool Corporation, Benton Harbor, Mich.

[21] Appl. No.: 30,998

[22] Filed: Mar. 27, 1987

Related U.S. Application Data

[63] Continuation-in-part of Ser. No. 870,328, Jun. 3, 1986, Pat. No. 4,688,393.

[51] Int. Cl.⁴ .................. F25D 17/04; F25D 21/06
[52] U.S. Cl. ............................. 62/187; 62/155; 62/180; 62/276; 62/234
[58] Field of Search ................ 62/187, 186, 180, 408, 62/151, 155, 234, 275, 276

[56] References Cited

U.S. PATENT DOCUMENTS

| | | | |
|---|---|---|---|
| 1,952,350 | 3/1934 | Armstrong | 236/76 |
| 2,778,197 | 1/1957 | Legeza et al. | 62/229 |
| 3,058,724 | 10/1962 | Maudlin | 257/278 |
| 3,332,475 | 7/1967 | Selhost et al. | 165/16 |
| 3,645,108 | 2/1972 | Houk | 62/187 |
| 3,975,669 | 8/1976 | Tyler | 318/624 |
| 4,173,871 | 11/1979 | Brooks | 62/234 X |
| 4,197,717 | 4/1980 | Schumacher | 62/234 X |
| 4,282,720 | 8/1981 | Stottman et al. | 62/180 |
| 4,581,901 | 4/1986 | Adams et al. | 62/234 |

FOREIGN PATENT DOCUMENTS

| | | | |
|---|---|---|---|
| 0133665 | 10/1979 | Japan | 62/187 |
| 0133666 | 10/1979 | Japan | 62/187 |

Primary Examiner—Harry B. Tanner
Attorney, Agent, or Firm—Lowe, Price, LeBlanc, Becker & Shur

[57] ABSTRACT

The baffle for controlling flow of chilled air through the divider wall between the frozen food and fresh food compartments of a refrigerator is coupled to a motor driven cam which indexes the baffle open or closed in response to commands from a conventional control unit. Electrical switches for controlling the compressor and defrost heater of the refrigerator are positioned axially along the cam to be operated selectively by concentric cam surfaces as the cam is rotated by the motor. A cam follower engages another concentric cam surface to operate another set of switches to apply rotational positional feedback signals to the control unit. The cam surfaces are shaped and the baffle is coupled to the cam such that unidirectional rotation of the cam in response to commands from the control unit operates the switches synchronously with the baffle to selectively cool the frozen food and fresh food compartments and defrost the evaporator.

16 Claims, 15 Drawing Figures

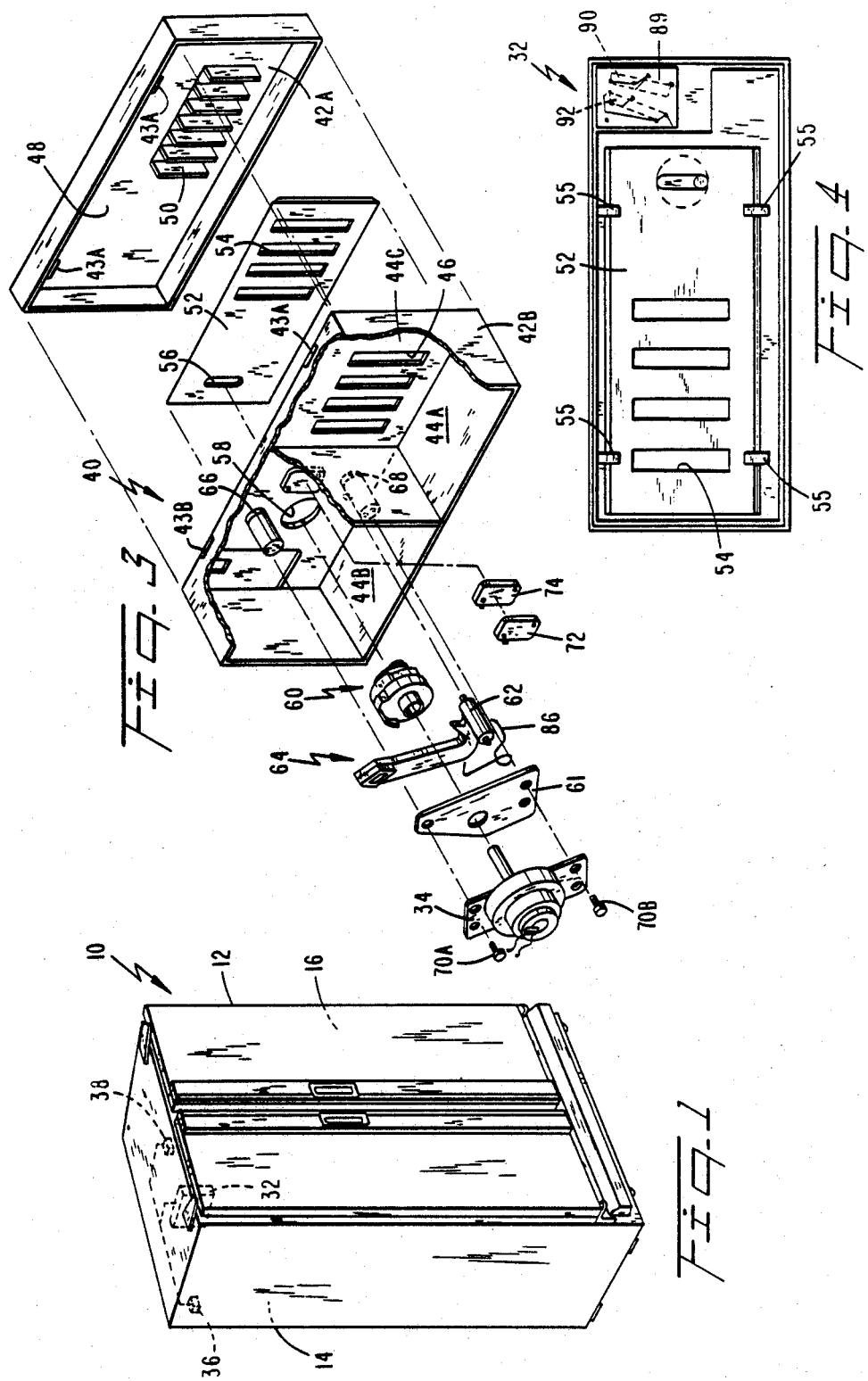

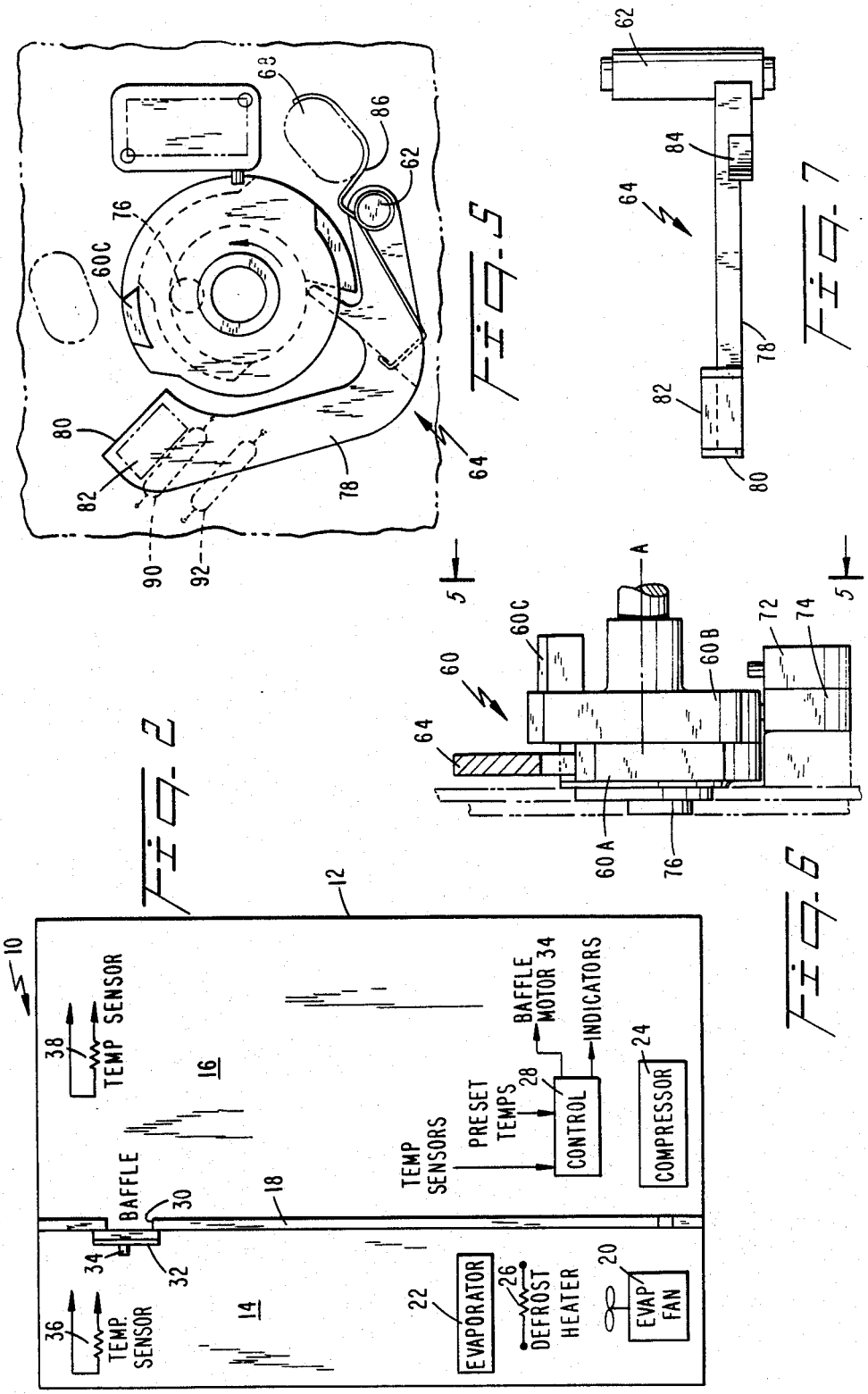

POSITION 1
COMPRESSOR OFF
DEF. HTR. OFF
BAFFLE OPEN

REFRIG. OFF OR COOL FRESH FOOD COMPARTMENT

POSITION 2
COMPRESSOR ON
DEF. HTR OFF
BAFFLE CLOSED

COOL FROZEN FOOD COMPARTMENT

POSITION 3
COMPRESSOR ON
DEF. HTR. OFF
BAFFLE OPEN

COOL BOTH FROZEN FOOD AND FRESH FOOD COMPARTMENT

POSITION 4
COMPRESSOR OFF
DEF. HTR. ON
BAFFLE CLOSED

DEFROST

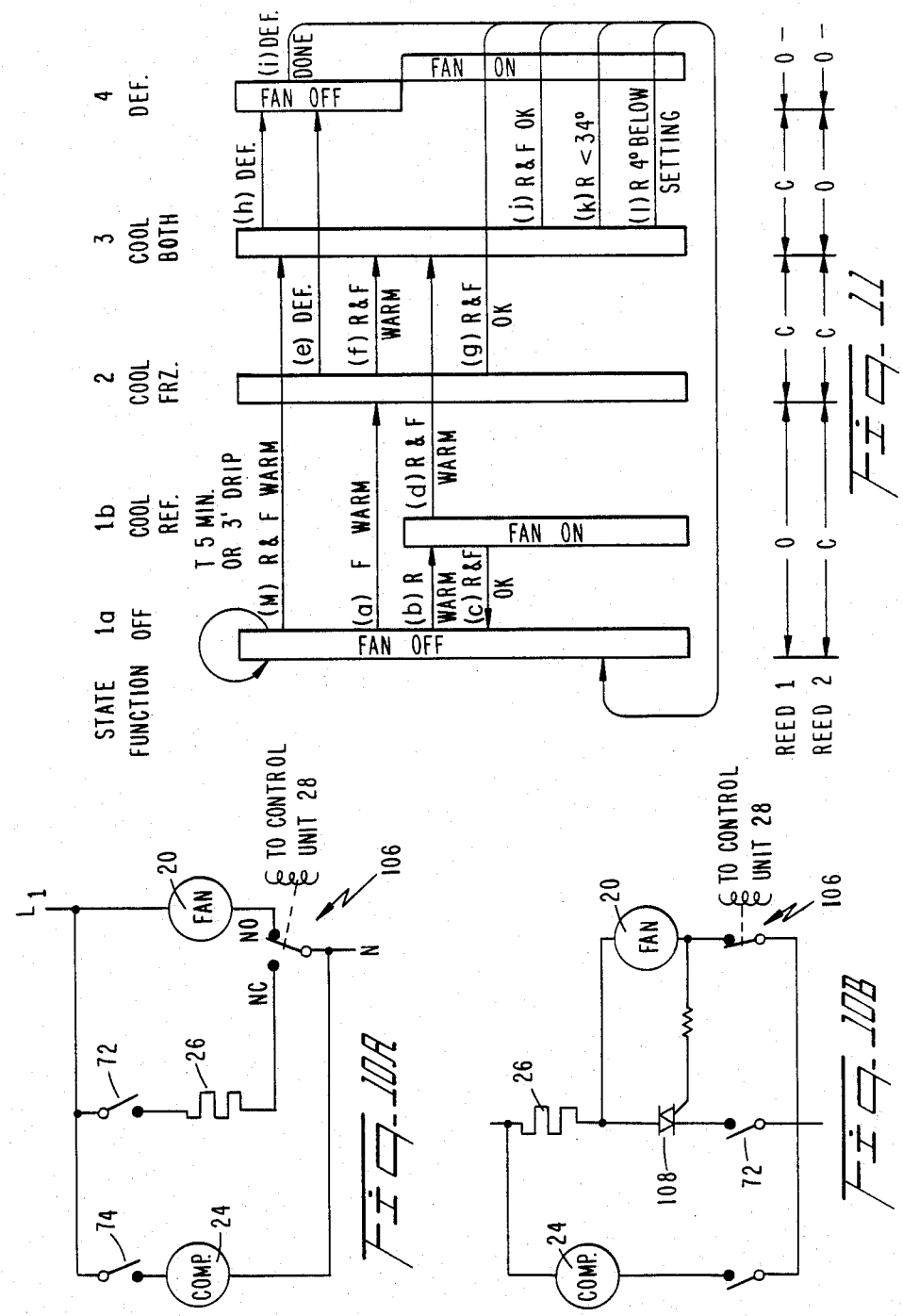

POWER SWITCH AND BAFFLE ASSEMBLY HAVING UNIDIRECTIONAL DRIVE MOTOR FOR A REFRIGERATOR

CROSS REFERENCE TO RELATED APPLICATION

This application is a continuation-in-part of application Ser. No. 870,328, filed on June 3, 1986, U.S. Pat. No. 4,688,393 and assigned to the assignee of this application.

FIELD OF THE INVENTION

This invention relates generally to baffle and switch control in a refrigerator, and more particularly, toward a unitary baffle and switch control assembly that is driven by a unidirectional motor in response to frozen food and fresh food compartment temperatures and to defrost commands.

BACKGROUND ART

In typical domestic refrigerators, a fresh food compartment and frozen food compartment separated from each other by a divider wall are cooled by a common compressor-condenser-evaporator system. The frozen food compartment is chilled to sub-freezing temperatures by a fan forcing air past the evaporator in the compartment. The fresh food compartment in turn is cooled by chilled freezer compartment air passing through a baffle in the divider wall.

Commonly, the temperature of the frozen food compartment is controlled directly by thermostat or microprocessor based cycling of the compressor to bring the frozen food compartment to its temperature set point. The temperature of the fresh food compartment in turn is controlled indirectly by operating the baffle to pass chilled frozen food compartment air through the divider wall into the fresh food compartment. When either compartment requires cooling, the evaporator fan is operated. During defrost, a defrost heater associated with the evaporator is energized and the baffle is closed.

Prior art controls require a baffle that is solenoid or bellows operated and further require relays or triacs to operate the compressor, fan and defrost heater. These controls accordingly are relatively complex, expensive and prone to failure. Furthermore, the continuous energization of relays or triacs whenever a load is energized adds undesirable heat to the compartment in which the devices are located. This heat must be removed by the refrigeration system requiring yet an additional expenditure of energy.

In copending application Ser. No. 870,328, supra, temperature control in multiple compartment refrigerators is simplified and made more reliable by a unitary electric switch and baffle control assembly comprising a cam mechanism that is linked to the baffle and has a profiled control surface adjacent a number of circumferentially arranged electric switches for operating the compressor, evaporator fan and defrost heater. As the cam is rotated bidirectionally by an electric motor to predetermined angles of rotation in response to output compounds from a microprocessor, the baffle is opened or closed and the switches are operated to cool the two compartments to their desired temperatures or to defrost the frozen food compartment. Particular cam angles of rotation corresponding to desired operating modes of the refrigerator are determined by fixed control resistors selected by the microprocessor in accordance with a demand for cooling or a defrost. The angle of rotation of the cam is measured by a potentiometer and is fed back to the control unit for comparison with the particular control resistor selected by the microprocessor.

This system, although satisfactory, requires a relatively expensive reversible electric motor to drive the cam bidirectionally, and the potentiometer for monitoring the angle of rotation of the cam must be a high quality, relatively expensive, potentiometer to provide an adequate component lifetime. However, virtually all potentiometers wear with frequent use over a long period of time and therefore will tend to become a source of component failure in the refrigerator. A need exists to reduce the cost and improve the reliability of a unitary electric switch and baffle control assembly of a type described in copending application Ser. No. 870,328.

SUMMARY OF THE INVENTION

In accordance with one aspect of the invention, temperature control in multiple compartment refrigerators is simplified and made more reliable by a unitary control assembly comprising a cam coupled to the intercompartment baffle and rotated by a unidirectional electric motor to predetermined positions in response to control signals generated by a conventional control unit. The cam has first and second control surfaces positioned axially along the axis of rotation of the cam. A first electrical switch means engaging the first cam control surface applies electricity from an external electrical power source selectively to the compressor and defrost heater, and a second electrical switch means engaging the second cam control surface applies feedback signals to the control unit to indicate the position of the cam. The baffle is coupled to the cam, and the first and second cam control surfaces are shaped, such that operation of the first and second electrical switch means and movement of the baffle during rotation of the cam are synchronized to each other to selectively cool the refrigerator compartments and defrost the evaporator.

Preferably, the first control surface of the cam comprises first and second surface portions spaced apart from each other along the axis of rotation of the cam, and the first electrical switch means comprises a pair of electrical switches operated by the first and second surface portions to control the compressor and defrost heater.

In accordance with another aspect of the invention, the second electrical switch means comprises a pair of reed switches that are operated by a magnet carried by one end of a cam follower. An intermediate portion of the follower engages the second control surface of the cam such that as the cam rotates, the magnet swings into proximity with the reed switches. The electrical states of the reed switches, read by the control unit, indicate the angular position of the cam.

In accordance with a further aspect of the invention, the cam follower comprises an elongated member pivotally mounted at an end of the follower opposite the end carrying the magnet. The distance between the cam engaging portion of the follower is closer to the pivot end than it is to the end carrying the magnet to provide a large arc of travel of the magnet about the reed switches as the cam rotates among its predetermined angular positions. This enables the reed switches to be relatively widely spaced apart to avoid magnetic coupling between them when the magnet is positioned by the cam follower to close only one of the switches.

Because the motor rotates the cam in only one direction, the cam energizes the defrost heater switch each time the compressor is cycled off. To reduce the energy consumption of the refrigerator, a relay for energizing the evaporator fan is operated by the control unit selectively in a first position in which the defrost heater is capable of being energized through the defrost heater switch and a second position in which the evaporator fan rather than the defrost heater is energized. The control unit controls the relay to be in the second position when the second cam control surface is momentarily at a position at which power would be applied to the defrost heater. This prevents the defrost heater from being energized as the second cam control surface moves momentarily past the heater energizing position during continuous movement between positions of the cam not requiring energization of the defrost heater.

Accordingly, one object of the invention is to provide an improved baffle and switch control assembly in a multiple compartment refrigerator that is economically produced and operates reliably.

Another object is to provide an improved unitary control assembly for efficiently operating the compressor, evaporator fan, defrost heater and baffle in a multiple compartment refrigerator.

A further object is to provide a unitary control assembly in a refrigerator for establishing desired frozen food and fresh food compartment temperatures by operating the baffle, compressor and evaporator fan synchronously in response to commands from a separate control unit.

A still further object of the invention is to provide, in a unitary power switch and baffle control assembly of a type having a motor driven cam coupled to the baffle and engaging power switches for controlling the compressor, evaporator fan and defrost heater of a multiple compartment refrigerator in response to command signals generated by a control unit to establish predetermined compartment temperatures, wherein the position of the cam is monitored and fed back to the control unit, an improvement wherein the assembly is configured such that the cam is rotated in only one direction by a low cost unidirectional motor and the position of the cam is monitored and fed back to the control unit by a number of low cost electric switches.

Another object is to reduce the electric energy consumption of a multiple compartment, self-defrosting refrigerator having a unitary power switch and baffle control assembly by eliminating unnecessary energization of the defrost heater.

Another, more specific object of the invention, is to reduce the electric energy consumption of a multiple compartment, self-defrosting refrigerator having a unitary power switch and baffle assembly comprising a unidirectionally rotating cam coupled to the baffle and engaging a pair of electric switches for controlling the compressor and evaporator fan to establish predetermined compartment temperatures and engaging a third switch for energizing the defrost heater, by preventing the defrost heater from being energized as the cam rotates momentarily past its defrost heater energizing position during continuous movement between positions of the cam not requiring energization of the heater.

Other objects and advantages of the present invention will become apparent from the following detailed description thereof made with reference to the accompanying drawings which form a part of the specification.

BRIEF DESCRIPTION OF THE DRAWINGS

FIG. 1 is a perspective view of a refrigerator having the improved control therein.

FIG. 2 is a front view of the refrigerator with temperature sensors, defrost heater and refrigeration components shown schematically.

FIG. 3 is an exploded view of a unitary baffle and switch control assembly provided in accordance with the invention.

FIG. 4 is a front view of the control assembly with its cover removed to expose the baffle therein.

FIG. 5 is a rear view of the cam, cam follower and switches of the control assembly taken along the lines 5—5 of FIG. 6;

FIG. 6 is an end view of the cam, follower and switches of the control assembly;

FIG. 7 is a bottom plan view of the cam follower and magnet;

FIGS. 10A-10B are schematic diagrams of circuit embodiments for energizing the evaporator fan rather than the defrost heater when the cam moves momentarily past its defrost heater energizing position during continuous movement between positions of the cam not requiring energization of the heater; and FIG. 11 is a state diagram summarizing the operation of the control assembly switching between various operating states.

DESCRIPTION OF THE PREFERRED EMBODIMENT

Figure 8A:
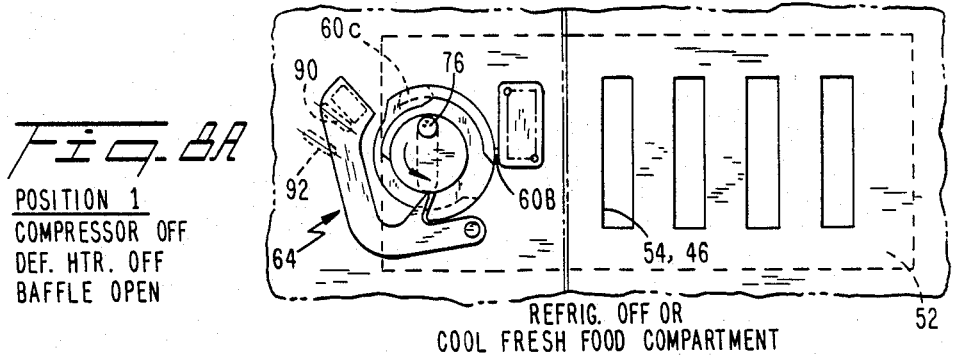
FIGS. 8A-8D show four positions of the control assembly of the invention for controlling the baffle and switches to establish the desired compartment temperatures and perform the defrost operation.

Referring to FIGS. 1 and 2, a refrigerator 10 embodying the invention comprises a cabinet 12 having a frozen food storage compartment 14 and a fresh food cooling compartment 16 separated by a divider wall 18 (FIG. 2). The frozen food compartment 14 is cooled by air moved by a blower or fan 20 past an evaporator 22 in turn chilled by a compressor 24. Within the frozen food compartment 14 is a defrost heater 26 to defrost the evaporator periodically under the control of a control unit 28 which preferably is a microprocessor based control. The structure of the refrigerator cabinet 12 and the defrost heater 26 and the operation of the evaporator-compressor-fan 20, 22, 24 refrigeration system, being conventional, are not described in detail herein. Also known in the prior art are microprocessor-based refrigerator controls capable of generating the appropriate refrigerator control signals, e.g., U.S. Pat. Nos. 4,481,785 and 4,488,823, assigned to the assignee of this invention and incorporated by reference herein.

Within the divider wall 18 is an opening 30 to permit chilled air from the frozen food compartment 14 to pass into the fresh food compartment 16. A baffle 32 mounted at the divider wall opening 30 is controlled by a baffle motor 34 to index the baffle selectively between its open and closed positions. The control 28 controls the operation of baffle motor 34, which controls compressor 24 and baffle 32 in response to the temperatures of the frozen food compartment 14 and fresh food compartment 16 and corresponding user preset temperatures. The temperature of the frozen food and fresh food compartments are measured by temperature sensors 36,38, which may be conventional thermistors. Corresponding user preset temperatures are provided to control 28 by conventional manual controls (not shown). Defrost heater 26 is also energized by baffle motor 34 under the control of control unit 28 as required. Evaporator fan 20 is controlled directly by control unit 28 through a relay 106.

When the temperature of the frozen food compartment 14, measured by temperature sensor 36, is above a user preset frozen food compartment temperature, whereby only the frozen food compartment requires cooling, the baffle 32 is closed and compressor 24 as well as evaporator fan 20 is turned on to chill the compartment. When the fresh food compartment temperature, measured by temperature sensor 38, is above a user preset temperature whereby only the fresh food compartment requires cooling, the baffle 32 is opened and the evaporator fan 20, but not the compressor 24, is turned on. When both the frozen food compartment 14 and fresh food compartment 16 require cooling, the baffle 32 is opened and both the evaporator fan 20 and the compressor 24 are turned on. During defrost, the baffle 32 is closed and the defrost heater 26 is energized; the evaporator fan 20 and compressor 24 are turned off.

Thus, whatever the current refrigeration requirement at any particular time, i.e., (1) no requirements, i.e., off, (2) cool frozen food compartment 14, (3) cool fresh food compartment 16, (4) cool both or (5) defrost, operation of the evaporator fan 20, compressor 24 and defrost heater 26 are synchronized with operation of the baffle 32.

In accordance with the invention, a unitary baffle and electrical switch assembly 40, shown in FIGS. 3 and 4, receives control signals from control unit 28 and, in response, controls the position of the baffle 32 and the electrical states of the compressor and defrost heater switches. This is an improvement over prior art wherein separate control units to operate the baffle 32 and energize the evaporator fan 20, compressor 24 and defrost heater 26 are required. As shall be described, the invention is further an improvement over application Ser. No. 870,238, supra, wherein a baffle and switch controlling cam is driven bidirectionally by a reversible motor, and cam position is monitored by a potentiometer. In the present invention, the power switch and baffle control assembly is reconfigured to drive the baffle and switch controlling cam provided therein with an inexpensive unidirectional motor, e.g., clock motor, and to monitor the position of the cam with inherently more reliable electrical switches.

Referring to FIG. 3, unitary control assembly 40 comprises a plastic housing 42 formed of a pair of housing portions 42A, 42B that interfit at tabs and indents 43A, 43B. The housing portion 42B is divided approximately mid-way by an integral wall 44 defining electrical switch and baffle sections 44A, 44B, respectively. A front wall 44C of housing portion 42B is formed with a series of slots 46 and wall 48 of housing portion 42A is formed with a series of louvered slots 50 to selectively permit flow of chilled air from the frozen food compartment 14 to the fresh food compartment 16, when the baffle and switch assembly 40 is mounted to divider wall 18 at opening 30 (FIG. 2) and the baffle is opened.

A baffle plate 52 containing a series of slots 54 corresponding to the slots 46 in wall 44C is slidably mounted to the outer surface of the wall 44C at tabs 55 (FIG. 4) whereby the baffle plate can be positioned with its slots 54 selectively in registration or out of registration with housing wall slots 46 to control flow of chilled air from the frozen food compartment 14 through the baffle 32 to the fresh food compartment 16. Another slot 56 formed in the baffle plate 52 at a portion spaced from the slots 54 is exposed to the interior of housing portion 42B through an aperture 58 to be coupled with cam 60, to be hereinafter described, for controlling the baffle, compressor and defrost heater.

Baffle motor 34, within section 44B of the housing 40, is mounted on a bearing plate 61 that is spaced from housing wall 44C by stand-offs 66 and 68. The motor 34 and bearing plate 61 are secured to the stand-offs 66, 68 by a pair of screws 70A, 70B, and the pivot 62 of a cam follower 64 is retained between a pair of apertures formed in the bearing plate 61 and housing wall 44C. Tandem electric switches 72 and 74 are located on the wall 44C of the housing portion 42B adjacent the cam 60. As shall be described in detail below, the switches 72 and 74 are operated by cam 60 to apply electricity from an external electrical power source selectively to the compressor and defrost heater in response to command signals generated by control 28, while the cam follower 64 monitors and feeds back to the control unit data indicating the angular position of the cam.

With reference to FIG. 6, cam 60 has three profiled control surfaces 60A, 60B, 60C, spaced along an axis of rotation A of the cam. The control surface 60A of cam 60 engages cam follower 64, as best seen in FIGS. 5A and 5B, to detect the angular position of the cam. As shall be described hereinafter, the follower 64 applies a position signal to the control unit 28 to control cam drive motor 34 so as to position the cam 60 to carry out desired operations of the refrigerator. Control surface 60B of cam 60 engages switch 74 which controls the compressor 24; control surface 60C engages switch 72 which controls the defrost heater 26. The cam control surfaces 60B and 60C are shaped such that during rotation of cam 60 in response to control signals generated by control unit 28, the switches 72 and 74 control the compressor and the defrost heater, and the baffle plate 52 of baffle 32 is operated, such that defrost takes place when required and the refrigeration compartments 14, 16 are maintained at desired temperatures.

An eccentric 76, projecting from one end of the cam 60, extends through the aperture 58 is housing wall 44C (FIG. 3) to couple to baffle plate 52 at slot 56. Accordingly, rotation of the cam 60 reciprocates the baffle plate 52 on tabs 55 to open or close the baffle, as required, to cool the fresh food compartment.

One end of the cam follower 64 is pivoted on member 62 adjacent the cam 60, as shown in FIGS. 5A and 5B. Extending from the member 62 is an arcuate arm 78 having an end 80 carrying a permanent magnet 82. At a portion of the arm 78 closer to pivot 62 then end 82 is a cam contacting member 84 (see also FIG. 7). A wire spring 86, wrapped around the pivot member 62 and is coupled to the follower 64 at shoulder 64A and to the inner surface of housing wall 44C at integral motor mount 68. The spring 86 biases the follower 64 toward cam 60 so that the cam engaging member 84 of the follower rides on the cam surface 60A (FIG. 6) during rotation of the cam.

A printed circuit board 89 (FIG. 4) upon which is mounted a pair of magnetic reed switches 90, 92, is located at one corner of housing wall 44C near the permanent magnet 82 on the follower 64. The reed switches 90, 92, shown more clearly in FIGS. 5A and 5B, are applied to inputs of control 28, to be described in detail hereinafter, to determine the angular position of the cam. The respective open or closed states of the two reed switches 90, 92 are capable of identifying four discrete angular positions of the cam, i.e.:

| Position No. | Reed Switch 90 | Reed Switch 92 |
|---|---|---|
| 1 | Closed | Open |
| 2 | Closed | Closed |
| 3 | Open | Closed |
| 4 | Open | Open |

Figure 8B:
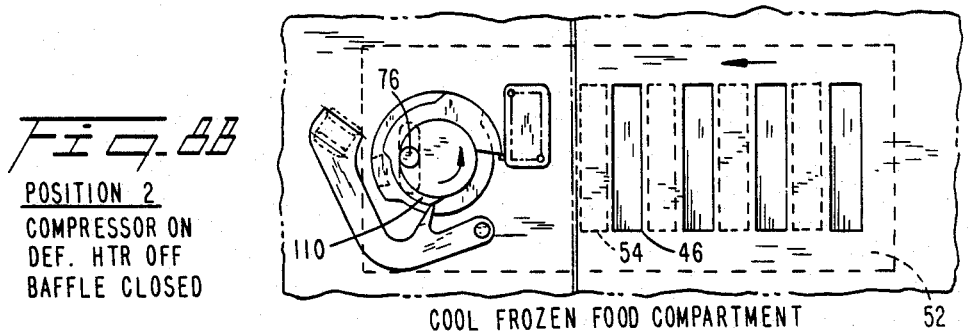
Figure 8C:
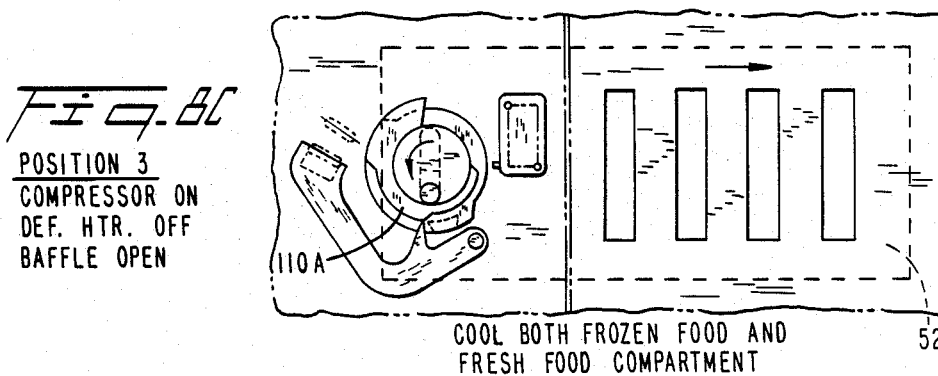

For example, referring to FIG. 8A, with the cam oriented with its eccentric 76 in a six o'clock position, as shown, cam follower 64 is pivoted by cam control surface 60A to locate magnet 82 adjacent only reed switch 90, whereby reed switch 90 is closed and reed switch 92 is open. In FIG. 8B, with eccentric 76 of cam 60 in a nine o'clock position, cam follower 64 is pivoted by the cam control surface 60A such that magnet 82 is adjacent both reed switch 90 and reed switch 92, whereby both switches are closed. In FIG. 8C, with eccentric 76 in a twelve o'clock position, only reed switch 92 is closed by magnet 82, and in FIG. 8D, with the eccentric 76 in a three o'clock position, both reed switches 90, 92 are open. The control unit 28 thus can determine which of the four angular positions shown in FIGS. 8A-8D the cam 60 currently is in, by detecting the open or closed states of the two reed switches 90, 92.

Compressor switch 74 is located adjacent control surface 60B of cam 60, as best shown in FIG. 6. The cam control surface 60B is shaped such that during rotation of the cam by cam drive motor 34 in response to control signals generated by control unit 28, the compressor is cycled to satisfy the demand for cooling of the frozen food and fresh food compartments 14, 16. Ganged to the compressor switch 74 is defrost heater switch 72 that is operated by cam control surface 60C to energize the defrost heater 26 in response to a call for defrost by the control unit 28. As shown more clearly in FIG. 5B, the control surface 60C comprises a sector that corresponds to a relatively small arc of rotation of the cam 60. The defrost heater 26 accordingly is energized while the cam 60 is in its three o'clock position, shown in FIG. 8D. As shall be explained hereinafter again with reference to FIGS. 8A-8D, the cam control surfaces 60A-60C are shaped and eccentric 76 of the cam 60 is located such that operation of the compressor and defrost heater by electric switches 72 and 74 and the position of plate 52 of baffle 32 are synchronized to each other to control the frozen food and fresh food compartment temperatures and to defrost the evaporator, when required.

Figure 9:
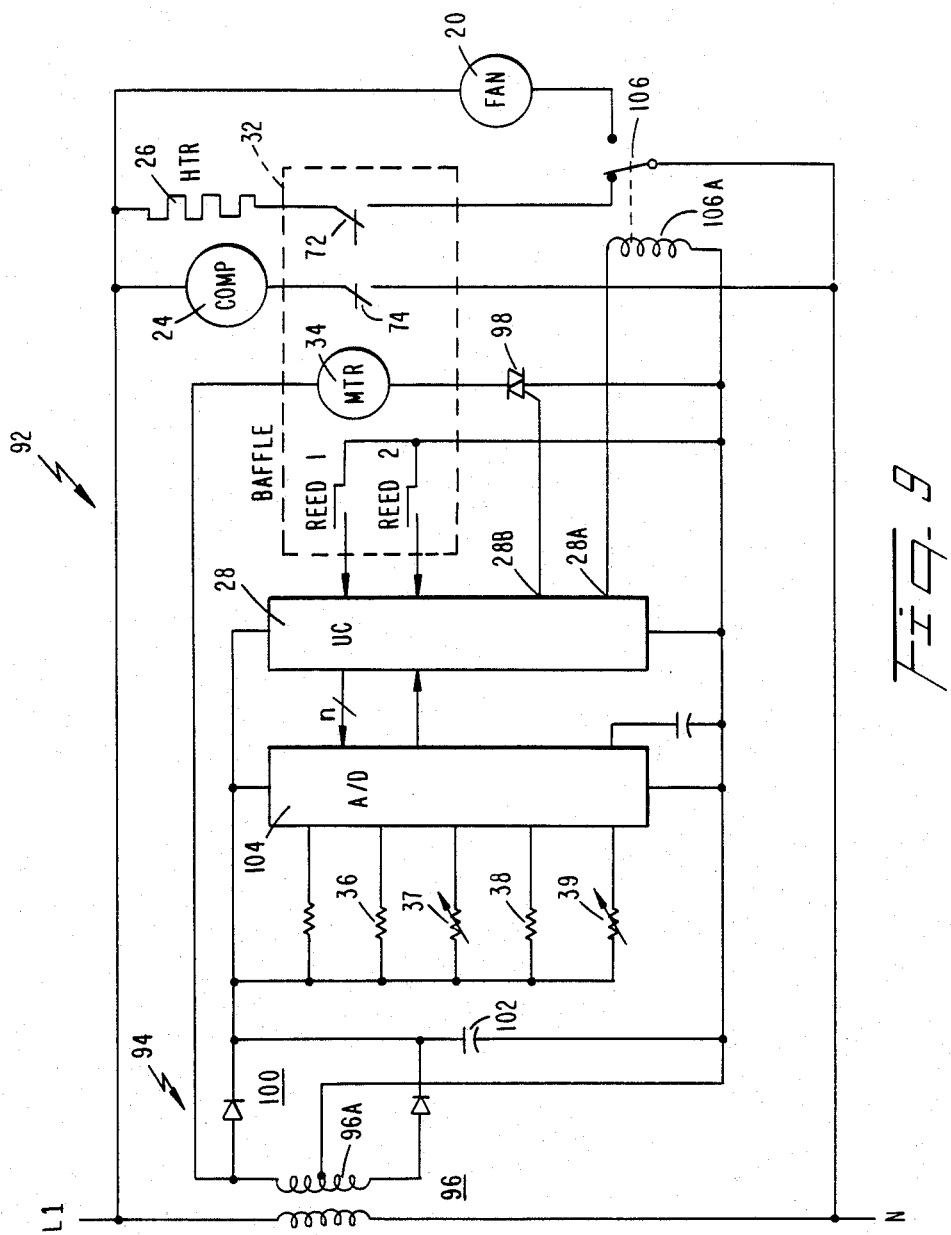
FIG. 9 is a circuit diagram of a refrigerator controlled by a power switch and baffle assembly.

With reference to FIG. 9, circuitry 92 for controlling refrigeration in accordance with the invention comprises a power supply 94 that includes a step-down transformer 96 for reducing household line AC voltage at power line terminals L1 and N to be applied, through a triac 98 to cam motor 34. Full wave rectifier 100 and filter capacitor 102 connected to the secondary winding 96A of transformer 96 supply a DC bias voltage to control unit 28, which preferably is a conventional microprocessor, as shown, and to an analog to digital (A/D) converter 104. A/D converter 104, which is described in detail in U.S. Pat. No. 4,488,823, supra, converts the resistances of the frozen food and fresh food compartment temperature sensors 36 and 38 as well as the resistances of the corresponding temperature setting potentiometers 37, 39 into corresponding digital signals to be applied as inputs to the control unit 28. The control unit 28 is programmed by firmware to control the compressor 24 and evaporator fan 20 to establish desired compartment temperatures, and to control the defrost heater 26 when a defrost cycle is required to defrost the evaporator as described in said patent. Heater 26 are supplied by electric switches 72, 74 that engage the corresponding control surfaces 60B and 60C of cam 60. The evaporator fan 20 in turn is controlled by the control unit 28 via a fan relay 106 having a relay coil 106A connected to one output terminal 28A of the control unit. A second output terminal 28B of the control unit 28 is connected to the gate of triac 98, to control cam drive motor 34 so as to rotate the cam to a predetermined angular position depending upon operation of the refrigeration components required. The angular position of the cam 60 in turn is fed back to the control unit by reed switches 90, 92 in accordance with the switch states shown in Table 1 above.

Operation of the power switch and baffle control assembly of this invention shall now become clear with reference to FIGS. 8A-8D, and Table 2 below.

TABLE 2

| Cam Position | Baffle 32 | Reed 90 | Reed 92 | Compressor 74 | Defrost Heater 72 |
|---|---|---|---|---|---|
| 1 a. Off | open | closed | open | off | off |
| *b. Refr. (only) | open | closed | open | off | off |
| 2 Frz. only | closed | closed | closed | on | off |
| 3 Refr. & Frz. | open | open | closed | on | off |
| 4 Defrost | closed | open | open | off | on |

*Evap. fan turned on.

In FIG. 8A, corresponding to position one in Table 2, neither the frozen food compartment 14 nor the fresh food compartment 16 requires cooling. Accordingly, with cam 60 oriented with its eccentric 76 in a six o'clock position, as shown in FIG. 8A, baffle plate 52 is oriented with its slots 54 in registration with housing slots 46 to permit flow of shown in FIG. 8A, baffle plate 52 is oriented with its slots 54 in registration with housing slots 46 to permit flow of cold air between the frozen food and fresh food compartments. Compressor switch 74, which is normally closed, is now open because the switch is in contact with cam control surface 60B, and heater switch 72, which is normally open, is now open because the switch is not in contact with cam control surface 60C. The follower 64, with its cam contacting portion 84 in the position shown in FIG. 8A against cam control surface 60A, is oriented with magnet 82 adjacent only reed switch 90. Accordingly, reed switch 90 is electrically closed and reed switch 92 is electrically open. The electrical states of reed switches 90, 92 applied to control unit 28 confirm that the cam is in position 1, i.e., no cooling of the frozen food compartment or fresh food compartment is required.

With the cam 60 in position 1 shown in FIG. 8A, if the fresh food compartment is required to be cooled and the frozen food compartment is not, the control unit 28 turns on the evaporator fan by closing relay 106 connected in series with fan 20 as shown in FIG. 9.

In position 2 of the cam 60, as shown in FIG. 8B, the cam has rotated clockwise until its eccentric 76 is oriented at a nine o'clock position to cool only the frozen food compartment 14. The baffle plate 52 is indexed by the eccentric 82 to the left in FIG. 8B until baffle slots 54 and housing slots 46 are out of registration with each other, to close the baffle 32 and isolate the frozen food and fresh food compartments from each other. Normally closed compressor switch 74 and normally opened heater switch 72 are out of contact with cam control surfaces 60B and 60C. Accordingly, the compressor 24 is turned on to cool the frozen food compartment, and the defrost heater 26 remains off. Evaporator fan 20 is turned on by the control unit 28 via relay 106 to blow chilled air into the frozen food compartment 14. The cam follower 64, now on land 110 of cam control surface 60A, has pivoted clockwise so that magnet 82 closes both of the reed switches 90, 92. The output of the reed switches 90, 92 is fed back to control unit 28 to confirm that the cam 60 is at nine o'clock (position 2) to cool the frozen food compartment 14.

When cooling of both the frozen food compartment 14 and fresh food compartment 16 is required, the control unit 28 rotates the cam 60 clockwise until eccentric 82 is at twelve o'clock (position 3), as shown in FIG. 8C. With the compressor switch 74 electrically closed, the baffle plate 52 is indexed by cam eccentric 76 to the right, as shown, to open baffle 32, the control unit 28 energizes evaporator fan 20 via relay 106 to move chilled air in the frozen food compartment into the fresh food compartment. The follower 64 pivots clockwise on land 110A of cam control surface 60A to close only reed switch 92. The open and closed states of reed switches 90 and 92, respectively, are fed back to the control unit 28 to confirm that the cam is at twelve o'clock (position 3) calling for operation of the compressor 24 and opening of the baffle 32.

Figure 8D:
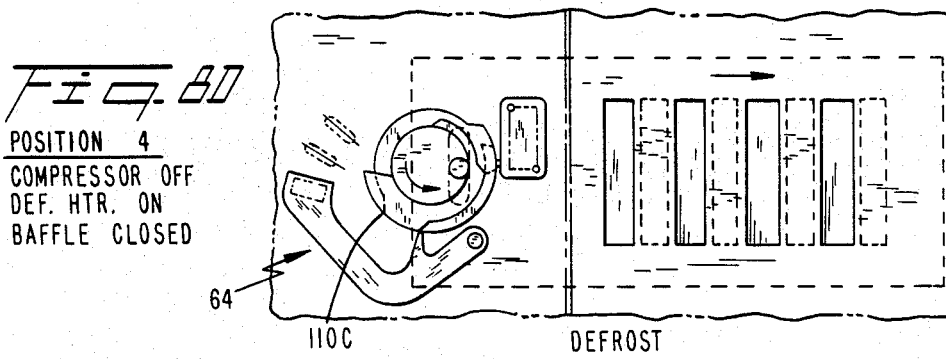

In FIG. 8D, the cam 60 is rotated to position 4 as shown, with eccentric 76 at three o'clock, to defrost the evaporator. The compressor switch 74 is electrically opened by engagement with cam control surface 60B, and the defrost heater switch 72 is electrically closed by engagement with cam control surface 60A to energize the defrost heater 26. Baffle plate 52 is indexed to the right to place baffle slots 54 and housing slots 46 out of registration with each other, and thereby to close the baffle 32. The follower 64 is pivoted clockwise on land 110C of cam control surface 60A. With magnet 82 now remote from reed switches 90, 92, the switches are electrically open to confirm to control unit 28 that the cam 60 is in position 4 to defrost the evaporator.

During defrost, the cam drive motor 34 is deenergized by control unit 28 for a time sufficient to melt ice on the evaporator as a result of heating by the heater 26. At the end of defrost, the control unit 28 again energizes the baffle drive motor 28 to rotate the cam 60 to its next operating position determined by the control unit in accordance with a demand for cooling.

Because cam 60 is rotated unidirectionally by motor 34, the cam 60 will pass through "defrost" (position 4) each time the cam is rotated by the control unit clockwise from position 3 to position 1. Accordingly, the defrost heater is periodically energized unnecessarily as the compressor cycles on and off during normal operation of the refrigerator. Because the defrost heater 26 dissipates a substantial amount of electric power, e.g., 700 watts, the electric power consumption of the refrigerator is noticeably increased by unnecessary energization of the heater. This is true even though the period of time that the defrost is energized as the cam rotates between the third and fourth rotational positions is small, e.g., a few seconds. Thus, in accordance with another aspect of the invention, the evaporator fan 20 and heater 26 are electrically interconnected through a relay such that the evaporator fan, rather than the defrost heater, is energized as the cam 60 passes through defrost when the control unit 28 does not demand a defrost. This is advantageous because the evaporator fan consumes substantially less electric power than the defrost heater, as the cam 60 passes through defrost. When the control unit 28 demands a defrost, the defrost heater rather than the evaporator fan is energized. FIGS. 10A and 10B are two implementations of a defrost heater-evaporator fan switching to carry out the function described.

In FIG. 10A, evaporator fan 20 and defrost heater 26 are connected respectively to the normally open (n.o.) and normally closed (n.c.) contacts of fan relay 106. Switches 72 and 74 are in series respectively with defrost heater 26 and compressor 24. When defrost is not required, i.e., the cam 60 is merely passing through defrost (position 4), the relay 106 is energized by control unit 28 into the position shown in FIG. 10A. Accordingly, even with defrost heater switch 72 closed, only the evaporator fan 20 is energized; the defrost heater 26 is open circuited by relay 106. Although the evaporator fan operates unnecessarily, the power consumption of the fan is small. During defrost, on the other hand, the control unit 26 deenergizes the fan relay 106 so that the relay is in series with defrost heater 26. Accordingly, with defrost heater switch 72 closed by cam 60, the defrost heater is energized.

In FIG. 10B, a triac 108 is connected in series with heater 26 and heater switch 72. The gate of the triac 108 is connected to a node between one terminal of evaporator fan 20 and the normally open terminals of fan relay 106. The opposite terminal of fan 20 is connected to the anode of the triac 108. When a defrost is demanded by control unit 28, and with defrost heater switch 72 closed by cam control surface 60C as the cam passes through position 4, fan relay 106 is opened by the control unit. This maintains evaporator fan 20 deenergized and turns triac 108 on, thereby energizing the heater 26. On the other hand, as cam 60 passes through defrost when defrost is not demanded by control unit 28, the control unit closes relay 106. Accordingly, even with defrost heater switch 72 closed momentarily by cam control surface 60C as the cam passes between positions 3 and 4, triac 106 is maintained off. This deenergizes the defrost heater 26 while the evaporator fan 20 is energized via the fan relay 106.

Operation of the power switch and baffle control assembly of he invention can now be understood with reference to FIG. 11 which describes all transitions between operating states that in practice will take place in a refrigerator. Arrows in FIG. 11 link each operating state of the refrigerator to a new desired state. The "states" identified in the upper portion of the Figure correspond to the operating states of the cam 60 identified in Table 2, except that the "a" and "b" suffixes correspond respectively to states of the refrigerator wherein the evaporator fan 20 is off (frozen food and fresh food compartments satisfied) and on (fresh food compartment requires cooling). In the lower portion of the Figure, the electrical states of the two reed switches 90, 92 are shown, wherein "o" is an electrically open switch and "c" is an electrically closed switch.

State transition (a) assumes that, initially, both the frozen food compartment and fresh food compartment temperatures correspond to their user selected temperatures, so that no cooling was required. However, the frozen food compartment 14 now requires cooling. In response, control unit 28 turns on triac 98 (FIG. 9) to energize motor 34 and rotate cam 60 clockwise until both reed switches 90, 92 are closed to confirm that the cam 60 is in state 2 (FIG. 8B). The compressor 24 is now energized and baffle 32 is closed, to chill the frozen food compartment.

In state transition (b), the fresh food compartment requires cooling. Accordingly, with baffle 60 maintained in state 1, i.e., baffle 32 is open, the control unit 28 closes evaporator fan relay 106 to energize the fan 20 for blowing cold air from the frozen food compartment 14 through baffle 32 into the fresh food compartment 16.

In state transition (c), the fresh food compartment 16 is now cooled to its desired temperature. In response, the control unit 28 opens evaporator fan relay 106 to deenergize the fan 20. It is noted that the cam does not rotate between states 1a and 1b; the left pointing arrow representing transition (c) accordingly does not violate the requirement that cam 60 be rotated unidirectionally.

In state transition (d), it is again assumed that the fresh food compartment 14 is being cooled to its desired temperature in state 1b. The frozen food compartment has now warmed and both require cooling. In response, control unit 28 energizes cam drive motor 34 to rotate the cam into state 3 (FIG. 8C), by maintaining the motor 34 energized until the control unit detects that reed switch 90 is closed and reed switch 92 is open. While cam 60 passes through state 2, compressor 20 is turned on and baffle 32 is temporarily closed. Once the cam arrives to state 3, however, the compressor 20 remains on but baffle 32 reopens to enable chilled air from the frozen food compartment 14 to pass through the baffle into the fresh food compartment 16.

In transition (e), the frozen food compartment was cooling in state 2. Control unit 28 now demands a defrost. Thus, the control unit 28 deenergizes the evaporator fan 20 and energizes cam drive motor 34 to rotate the cam to state 4, shown in FIG. 8D. The control unit 28 thus maintains the cam drive motor 34 energized until the states of reed switches 90, 92 have both become electrically open. The compressor 20 remains energized through compressor switch 74 as the baffle 34 opens while the cam rotates through state 3 to arrive at state 4. When the cam 60 is in state 4, as shown in FIG. 8D, the baffle 34 is closed, the compressor 24 is deenergized by switch 74, and defrost heater 26 is energized through switch 72.

In transition (f), the frozen food compartment 14 has been cooling to the desired temperature. Now, the fresh food compartment 16 is warmed, and, together with the frozen food compartment, requires cooling. In response, the control unit 28 energizes cam drive motor 34 to rotate the cam from state 2 (FIG. 8B) to state 3 (FIG. 8C). With the compressor 24 maintained energized and the defrost heater not energized, baffle 32 is opened to circulate chilled air from the frozen food compartment 14 to the fresh food compartment 16.

In transition (g), it is assumed that the frozen food compartment has been cooled in state 2 until further cooling of the frozen food compartment is no longer required. Since cooling of the fresh food compartment is already satisfied, no further cooling of either compartment 14, 16 is required. In response, the control unit 28 energizes cam drive motor 34 to rotate the cam to state 1a (FIG. 8A). The cam 60 passes through states 3 (FIG. 8C) and 4 (FIG. 8D) as it travels to state 1a. To prevent the defrost heater from being momentarily energized as the cam 60 rotates through state 4, the evaporator fan 20 is maintained on until state 1a is reached, using either of the circuit implementations shown in FIGS. 10A and 10B. It does not matter that the cam passes through state 3, momentarily opening the baffle 32, since momentary opening of the baffle during state 3 does not consume any substantial electric power.

In transition (h), it is assumed that both the frozen food compartment and fresh food compartment were cooling in state 3, and the control unit 28 now calls for a defrost. In response, the control unit deenergizes fan 20 by opening relay 106, and cam drive motor 34 is energized to rotate the cam 60 from state 3 to state 4, by detecting when both of the reed switches 90 and 92 are open. In state 4 (FIG. 8D), the baffle 32 is closed and the defrost heater 26 is energized.

Transition (i) assumes that defrost is to be terminated. This is carried out by detecting the temperature of the evaporator coil to determine that the coil is clear of ice. In response, the cam 60 is rotated to position 1 (FIG. 8A), thereby deenergizing heater 26. The control unit 28 maintains the cam 60 in this position for a predetermined time, e.g., three minutes, to enable the evaporator coil to drip before recooling, if needed, is carried out.

In transition (j), it is assumed that both the frozen food and fresh food compartments were being cooled, in state 3. Both compartments now are presumed to be satisfied, and in response, the control unit 28 rotates cam 60 through state 4 to state 1a. The control unit 28 again maintains the evaporator fan 20 on via relay 106 to prevent the defrost heater 26 from being energized, until the cam 60 reaches state 1a determined by the open and closed states of reed switches 90, 92, respectively.

In practice, the likelihood that the frozen food compartment and fresh food compartment will become satisfied at the same time is very small. It is likely that one of the two compartments will be slightly colder than required before the other compartment is satisfied. Accordingly, state transitions (k) and (l) described below provide overrides to prevent the fresh food compartment from being cooled excessively.

In transition (k), following cooling of both the frozen food and fresh food compartments in state 3, the fresh food compartment has cooled to 34 degrees while the frozen food compartment still requires additional cooling. In response, the control unit rotates the cam 60 to state 1a, with fan 20 maintained on to prevent the defrost heater 26 from being momentarily energized as the cam passes through state 4. The control unit now maintains the cam in state 1a for five minutes, and thereafter, the cam is further rotated to state 2 to cool the frozen food compartment.

In transition (l), it is assumed that following cooling of both the frozen food and fresh food compartments the fresh food compartment has cooled to some value, such as four degrees, below its preset temperature while the frozen food compartment still requires cooling. In response, the control unit 28 rotates cam 60 through state 4, while maintaining the evaporator fan 20 on to prevent the defrost heater 26 from being momentarily energized. The cam is now maintained in state 1a for, e.g., five minutes, and thereafter, the cam is rotated to state 2, to further cool the frozen food compartment.

Finally, in transition (m), following some period of time with cam 60 in state 1a, and likely following a defrost, both the frozen food and fresh food compartments will require cooling. In response, the control unit 28 rotates cam 60 through state 2 to state 3, wherein reed switches 90, 92 are closed and open, respectively (FIG. 8C). As the cam passes through state 2, compressor 24 is energized and the baffle 32 closed. As the cam 60 advances to state 3, however, the compressor remains on but the baffle 32 opens. The control unit 28 energizes fan 20 through relay 106 as the cam rotates toward state 3.

There has accordingly been described an improved unitary power switch and baffle control assembly that avoids the use of a bidirectional motor and potentiometer as is required in application Ser. No. 870,328, supra, and instead is implemented using a clock motor or other unidirectional cam drive motor and electric switches, such as ordinary reed switches, for detecting the position of the cam. The compressor and defrost heater are operated by cam control surfaces spaced axially along the cam, and the reed switches indicating cam position to the control unit are operated by a magnet that is carried by a follower in engagement with the cam. To prevent unnecessary energization of the defrost heater as the cam is rotated unidirectionally during cycling of the compressor, the evaporator fan and fan relay are connected in circuit with the defrost heater to electrically bypass the evaporator fan when the defrost heater switch is closed by the cam but defrost is not required.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. In a refrigerator having a cabinet defining a frozen food compartment and a fresh food compartment separated from each other by a divider wall, a through opening formed in said wall to enable cold air from said frozen food compartment to flow into said fresh food compartment; a baffle selectively closing said opening; a compressor; an evaporator fan for circulating chilled air within said frozen food compartment and through said opening into said fresh food compartment; temperature sensor means for measuring the temperatures of said fresh food and frozen food compartments and control means responsive to said temperature sensor means for producing command signals indicative of the need to cool said compartments; a system for controlling said baffle, compressor and evaporator fan to maintain predetermined frozen food and fresh food compartment temperatures, comprising:
   a cam having first and second control surfaces;
   first electrical switch means operated by movement of said first control surface to apply electricity from an external electrical power source selectively to said compressor and said defrost heater;
   means for coupling said cam to said baffle;
   motor means responsive to said command signals for moving said cam;
   second electrical switch means operated by movement of said second control surface to apply feedback signals to said control means to indicate the position of said cam;
   the control surfaces of said cam being shaped and said coupling means interconnecting said cam and said baffle such that operation of said electrical switches and said baffle during movement of said cam are synchronized to each other to selectively cool said compartments and defrost the evaporator.

2. The refrigerator of claim 1 further including a cam follower engaging the second control surface and wherein said switch means comprise reed switches and a magnet mounted on a first end of said cam follower to actuate said reed switches.

3. The refrigerator of claim 2, wherein said cam follower comprises an elongated member pivotally mounted at a second end and defining a cam contacting surface closer to said follower second end than to said follower first end.

4. The refrigerator of claim 1, wherein said motor means comprises a unidirectional motor and said control means includes a microcomputer control capable of selectively energizing said motor.

5. The refrigerator of claim 4, further having an evaporator fan and a relay, said relay selectively operated by said microcomputer between a first position in which said defrost heater is capable of being energized and a second position in which said evaporator fan is energized, wherein said microcomputer is capable of causing said relay to be in said second position when said first control surface is momentarily at a position at which power would be applied to said defrost heater, whereby the defrost heater will not be energized as the cam moves the first control surface momentarily past the defrost heater energizing position during continuous movement between positions not requiring energization of the defrost heater.

6. In a refrigerator having a cabinet defining a frozen food compartment and a fresh food compartment separated from each other by a divider wall, a through opening formed in said wall to enable cold air from said frozen food compartment to flow into said fresh food compartment; a baffle selectively closing said opening; a compressor; an evaporator fan for circulating chilled air within said frozen food compartment and through said opening into said fresh food compartment; temperature sensor means for measuring the temperatures of said fresh food and frozen food compartments and control means responsive to said temperature sensor means for producing command signals indicative of the need to cool said compartments; a system for controlling said baffle, compressor and evaporator fan to maintain predetermined frozen food and fresh food compartment temperatures, comprising:
   a cam having first, second and third control surfaces spaced apart from each other axially on said cam;
   motor means responsive to said command signals for rotating said cam;
   means for coupling said cam to said baffle;
   first electrical switch means operated by movement of said first control surface of said cam for applying electricity from an external electrical power source to said compressor;
   second electrical switch means operated by movement of said second control surface of said cam for applying electricity from the external electrical power source to said defrost heater;
   third electrical switch means operated by movement of said third control surface of said cam for applying feedback signals to said control means to indicate the rotational position of said cam;
   said first, second control surfaces of said cam being shaped and said coupling means interconnecting said cam and said baffle such that operation of said first, second and third electrical switches and said baffle during rotation of said cam are synchronized to each other to selectively cool said compartments and defrost the evaporator.

7. The refrigerator of claim 6 further including a cam follower engaging the third control surface and wherein said third electrical switch means comprise reed switches and a magnet mounted on a first end of said cam follower to actuate said reed switches.

8. The refrigerator of claim 7, wherein said cam follower comprises an elongated member pivotally mounted at a second end and defining a cam contacting surface closer to said follower second end than to said follower first end.

9. The refrigerator of claim 7, wherein said motor means comprises a unidirectional motor and said control means includes a microcomputer control capable of selectively energizing said motor.

10. The refrigerator of claim 9, further having an evaporator fan and a relay, said relay selectively operated by said microcomputer between a first position in which said defrost heater is capable of being energized and a second position in which said evaporator fan is energized, wherein said microcomputer is capable of causing said relay to be in said second position when said second control surface is momentarily at a position at which power would be applied to said defrost heater, whereby the defrost heater will not be energized as the cam moves the second control surface momentarily past the defrost heater energizing position during continuous movement between positions not requiring energization of the defrost heater.

11. In a refrigerator having a cabinet defining a frozen food compartment and a fresh food compartment separated from each other by a divider wall, a through opening formed in said wall to enable cold air from said frozen food compartment to flow into said fresh food compartment; a baffle selectively closing said opening; a compressor; an evaporator fan for circulating chilled air within said frozen food compartment and through said opening into said fresh food compartment; temperature sensor means for measuring the temperatures of said fresh food and frozen food compartments and control means responsive to said temperature sensor means for producing command signals indicative of the need to cool said compartments; a system for controlling said baffle, compressor and evaporator fan to maintain predetermined frozen food and fresh food compartment temperatures, comprising:
a cam having a control surface;
motor means for moving said cam;
first, second and third electrical switches spaced apart from each other perpendicular to a direction of movement of said cam;
said first and second switches operated by movement of said control surface to apply electricity from an electrical power source selectively to said compressor and said defrost heater;
said third electrical switch operated by movement of said control surface to provide a feedback signal to said control means to indicate the position of said cam; and
means for coupling said cam to said baffle;
the control surface of said cam being shaped and said coupling means interconnecting said cam and said baffle such that operation of said first, second and third electrical switches and said baffle during movement of said cam are synchronized to each other to selectively cool said compartments and defrost the evaporator.

12. The refrigerator of claim 11, wherein said cam is mounted for rotation on a central axis and said motor means rotates said cam about said axis.

13. The refrigerator of claim 12, further including a cam follower engaging the third control surface and wherein said third electrical switch means comprise reed switches and a magnet mounted on a first end of said cam follower to actuate said reed switches.

14. The refrigerator of claim 13, wherein said cam follower comprises an elongated member pivotally mounted at a second end and defining a cam contacting surface closer to said follower second end than to said follower first end.

15. The refrigerator of claim 13, wherein said motor means comprises a unidirectional motor and said control means includes a microcomputer control capable of selectively energizing said motor.

16. The refrigerator of claim 12, further having an evaporator fan and a relay, said relay selectively operated by said microcomputer between a first position in which said defrost heater is capable of being energized and a second position in which said evaporator fan is energized, wherein said microcomputer is capable of causing said relay to be in said second position when said control surface is momentarily at a position at which power would be applied to said defrost heater, whereby the defrost heater will not be energized as the cam moves the control surface momentarily past the defrost heater energizing position during continuous movement between positions not requiring energization of the defrost heater.

* * * * *